United States Patent [19]

Hatayama et al.

[11] Patent Number: 4,668,996
[45] Date of Patent: May 26, 1987

[54] METHOD AND APPARATUS FOR GENERATING HALFTONE DOTS

[75] Inventors: Fumihiro Hatayama; Makoto Hirosawa, both of Kyoto, Japan

[73] Assignee: Dainippon Screen Mfg. Co., Ltd., Japan

[21] Appl. No.: 860,492

[22] Filed: May 7, 1986

[30] Foreign Application Priority Data

May 15, 1985 [JP] Japan .................................. 60-104329

[51] Int. Cl.[4] .......................... H04N 1/21; H04N 1/23; H04N 1/40
[52] U.S. Cl. .................................. 358/298; 358/283; 358/296
[58] Field of Search ............... 358/268, 273, 280, 283, 358/290, 296, 298

[56] References Cited

U.S. PATENT DOCUMENTS 4,327,380 4/1982 Yamada et al. ................. 358/268 X Primary Examiner—George H. Miller, Jr.
Assistant Examiner—Linda M. Peco
Attorney, Agent, or Firm—Lowe, Price, LeBlanc, Becker & Shur

[57] ABSTRACT

A sub scanning line counter and a main scanning position counter count absolute record-scanning position. A halftone pattern memory outputs binary image output signals for resulting halftone dots in response to comparison of halftone dot density of a halftone pattern partial position previously related with the aboslute record-scanning position determined by count values of the sub scanning line counter and the main scanning position counter with density of the image input signal at that time. A preset value calculating circuit calculates, in case of starting record-scanning from the middle of the recording screen, the count value of the sub scanning line counter corresponding to the scanning start point in advance to starting scanning, thereby to preset the calculated value in the sub scanning line counter. Thus, in case of performing halftone processing in an image scanning/recording unit such as a composing scanner, continuous halftone dots can be generated in connected portions of a plurality of duplicate recorded images obtained by separately scanning a plurality of originals.

9 Claims, 4 Drawing Figures

METHOD AND APPARATUS FOR GENERATING HALFTONE DOTS

BACKGROUND OF THE INVENTION

1. Field of the Invention

The present invention relates to an image scanning-/recording apparatus such as a composing scanner for separately scanning a plurality of originals to record pictorial images in which duplicate pictorial images are in countact with each other. More specifically, it relates to a method of and an apparatus for generating continuous halftone dots in connected portions of separate images for halftone processing, for use in such an image scanning/recording device.

2. Description of the Prior Art

Development of a plain layout scanner saving image memory has enabled low-cost implementation of a layout function for recording a plurality of pictorial images on photosensitive material along desired layout. In order to prevent displacement in registering etc. of resulting printed material thereby to improve the quality of the same, positional relation between respective recorded images must be correctly matched with each other between respective ones of four color printing plates. Therefore, in an image scanning method as disclosed in Japanese Patent Laying-Open Gazette No. 31359/1985 in the name of DAINIPPON SCREEN MFG. CO.,LTD., sub scanning positions theoretically obtained from the number of main scanning lines and main scanning positions are maintained in correspondence with actual sub scanning positions thereby to improve accuracy of registration between the respective recorded images. According to this method, a recording head can be maintained to be always in the same scanning locus in case of separately scanning a plurality of originals to record respective images on the photosensitive material, whereby scanning lines on the respective recorded images by separate scanning are matched with each other (i.e., scanning lines by separate scanning are connected in line), and hence continuity of the scanning lines between the respective recorded images can be maintained to avoid appearance of clearances and overlapping in boundaries between a plurality of duplicate recorded images.

In such a method, however, improvement of the picture quality is not necessarily sufficient with respect to recording of halftone images through a halftone dot generator. Assuming that, for example, a halftone repeating pattern is partially formed by one main scanning in halftone processing by a halftone dot generator, it is anticipated that such a situation as shown in FIG. 1(a) may be frequently caused that a recording region 31 for first scanning is completed in the middle of the pattern at a boundary X and a subsequent recording region 32 for second scanning is started from the middle of the pattern at the boundary X. If the second sub scanning is started from a position corresponding to the boundary X in this case, it is indefinite from which part of the halftone pattern the halftone dot generator genrates halftone dots (i.e., it is uncertain whether or not the halftone dot generator generates the halftone dots continuously to those in the first scanning), and hence the halftone pattern is made discontinuous along the boundary X as shown in FIG. 1(b) in most of the case. In broad perspective, discontinuous portions of haltone thus formed are visible as black creases when area mean density is increased in the vicinity of boundaries while the same are visible as white creases when the area mean density is reduced. In order to avoid such a problem, the second sub scanning may be started again from the scanning origin to form a haltone pattern which is similar to (overlapping with) the first pattern absolutely from the beginning, whereas, in this case, useless scanning is performed without recording until it reaches an actually necessary scanning point (i.e., a sub scanning position corresponding to the boundary X ) for a relatively long time, and hence the processing time is increased.

SUMMARY OF THE INVENTION

The present invention is directed to a method of and an apparatus for generating halftone dots along predetermined halftone patterns on the recording plane or screen on the basis of input image signals in an image scanning/recording device. According to the present invention, scanning positions in recording and partial positions of the halftone patterns are previously related with each other, and in order to generate the halftone dots from the middle of the recording screen, a partial position of the halftone pattern corresponding to the scanning start position in the middle of the screen is preset to generate the halftone dots in compliance with the said relation from the preset partial position.

In a preferred embodiment of the present invention, the said relation is attained by previously relating the absolute sub scanning position obtained by counting the main scanning position and the number of sub scanning lines by counters with halftone dot density of the partial position of the halftone apttern. The halftone patterns may be cyclic, and in this case, the counters may be provided for the pattern cycles.

In another preferred embodiment of the present invention, the said presetting is performed, in case of starting record-scanning from an $L_n$-th scanning line from the scanning origin, by presetting the remainder of $L_n/L_c$ assuming that $L_c$ represents the number of pattern repeating cycle lines, or by presetting the remainder of $(L_n - L_r)/L_c$ assuming that $L_r$ represents the number of lines required for the rise of a scanning mechanism.

Accordingly, an object of the present invention is to provide a method of and an apparatus for generating halftone dots which can continuously connect halftone dots in connection boundaries without useless scanning, thereby to continuously connect specific patterns such as halftone patterns by a plurality of times of scanning in an image scanning/recording device.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 2:
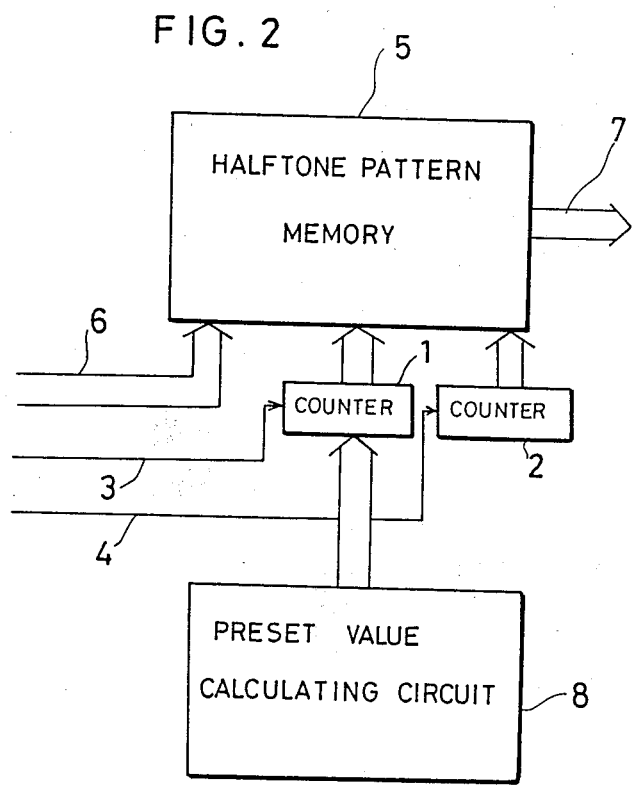
FIG. 2 is a block diagram showing an embodiment of a method of generating halftone dots according to the present invention.

FIG. 2 is a block diagram showing an embodiment of a method of generating halftone dots according to the present invention. Scanning positions in recording and partial positions of halftone patterns are related with each other through a sub scanning line counter 1 and a main scanning position counter 2. The sub scanning line counter 1 receives a count signal 3 every time a recording head (not shown) completes scanning for one scanning line to count the same while the main scanning counter 2 receives count signals 4 which are supplied at appropriate intervals in correspondence to movement of the recording head performing scanning on a scanning line. In other words, count values of the sub scanning line counter 1 and the main scanning position counter 2 are respectively indicative of vertical and main scanning positions of the recording head, whereby the absolute record-scanning positions can be recognized by checking the contents of the said counters 1 and 2.

The absolute record-scanning positions are related with partial positons of halftone patterns through halftone pattern memory 5. The halftone pattern memory 5 is formed by, e.g., a look-up table, the contents of which are selected by the count values of the sub scanning line counter 1 and the main scanning position counter 2 and image input signals 6 from an input-scanning portion (not shown). The look-up table is previously provided to obtain binary image output signals 7 for resulting halftone dots in response to comparison of halftone dot density of the halftone pattern partial positons previously made to correspond to the absolute record-scanning positions which are determined by the count values of the sub scanning line counter 1 and the main scanning position counter 2 with density of the image input signal 6 at that time. The halftone pattern memory 5 may not be provided as a look-up table, but may form a calculating circuit. Also in this case, input/output relation is such that the image output signals 7 are determined by the count values of the sub scanning line counter 1 and the main scanning position counter 2 and the input image signals 6, similarly to the above description.

Figure 1A:
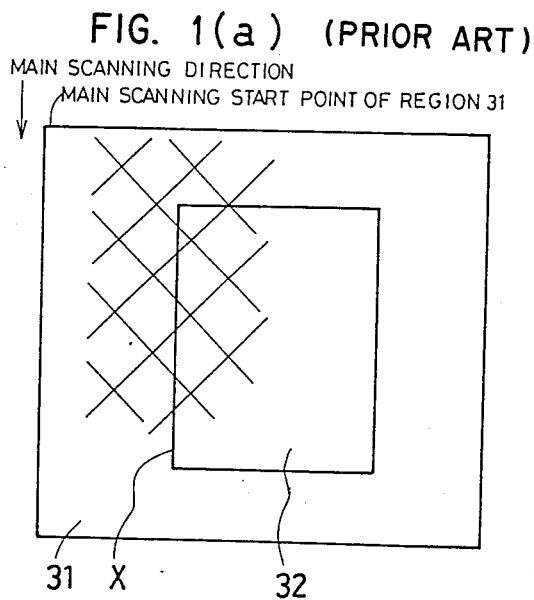
FIG. 1 is an explanatory diagram showing connection between halftone patterns.
Figure 1B:
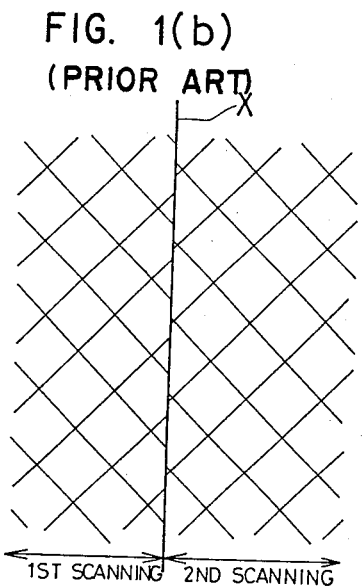

In general, halftone patterns are formed by repeating the same patterns (including the case of repeating a plurality of halftone patterns) as shown in FIG. 1, and hence the sub scanning line counter 1 and the main scanning position counter 2 may be set in count width matching with repeating cycles of the halftone patterns. This is because the count width can express all of partial positions in one pattern and halftone dot density corresponding to each partial position in the patterns is repeated commonly to all of the patterns, whereby counting may be repeated in the aforementioned cycles in response to changes in the record-scanning positions. Vertical and horizontal repeating cycles of the halftone patterns vary with yellow, magenta, cyan and black plates.

A present value calculating circuit 8 is adapted to calculate the count value of the sub scanning line counter 1, which count value corresponds to a scanning start point in case of starting record-scanning from the middle of the recording screen, in advance to starting of the scanning thereby to preset the said value in the sub scanning line counter 1. For example, consider such case where the sub scanning line counter 1 is reset at zero in the scanning origin while the counter 1 is up-counted with time, to start record-scanning from an $L_n$-th scanning line from the scanning origin. Assuming that symbol $L_c$ represents the pattern repeating cycle line number (equivalent to the count width of the sub scanning line counter 1), the preset value calculating circuit 8 performs, before starting the scanning, the following calculation:

$$\text{remainder of } L_n/L_c \quad \ldots (1)$$

thereby to preset the value in the sub scanning line counter 1. The result of calculation of the expression (1) represents a partial position of the pattern which is to be univocally determined in correspondence to the scanning start point on the recording screen, so that halftone dots are generated from the said partial position of the pattern whereby the halftone dots can be obtained in continuation with those generated in advance to the $L_n$-th scanning line by previous scanning.

The main scanning position counter 2 is reset for every main scanning start point (start point of each scanning line) similarly to the conventional case, and no particular count value is preset at a start point of a region requiring main scanning. This is because it is practically impossible to start main scanning from the middle in the case of the drum-type scanner and because idling time is extremely short in the main scanning direction to cause no particular problem and hence there is no need to particularly start main scanning from the middle. Thus, as shown in FIG. 1(a), the main scanning position counter 2 starts upcounting from a main scanning start point of a recording region 31 to generate the halftone pattern in response to the count value thereof for a recording region 32 in second scanning, while the halftone pattern image only in the recording region 32 can be recorded by masking means (not shown) for generating masking signals in the second scanning.

When the scanning is performed through mechanical structure, slight rise time is required from starting of the scanning to transition to a stationarty scanning state. Therefore, it is necessary to start the scanning from a position slightly ahead of the actual scanning region, and in such case, the preset value in the expression (1) must be corrected in compliance with the number $L_r$ of lines required for the said rise. Namely, in place of the expression (1), the preset value calculating circuit 8 calculates the following expression:

$$\text{remainder of } (L_n - L_r)/L_c \quad \ldots (2)$$

thereby to preset the result of the calculation in the sub scanning line counter 1. The aforementioned masking means is operated also in the sub scanning direction, in addition to the main scanning direction.

The above description is made on the premise that the recording head (not shown) traces absolutely the same scanning locus in any case of a plurality of times of scanning. In order to attain this, for example, the scanning method as disclosed in the Japanese Patent Laying-Open Gazette No. 31359/1985 may be employed, which scanning method is hereinafter briefly described.

Figure 3:
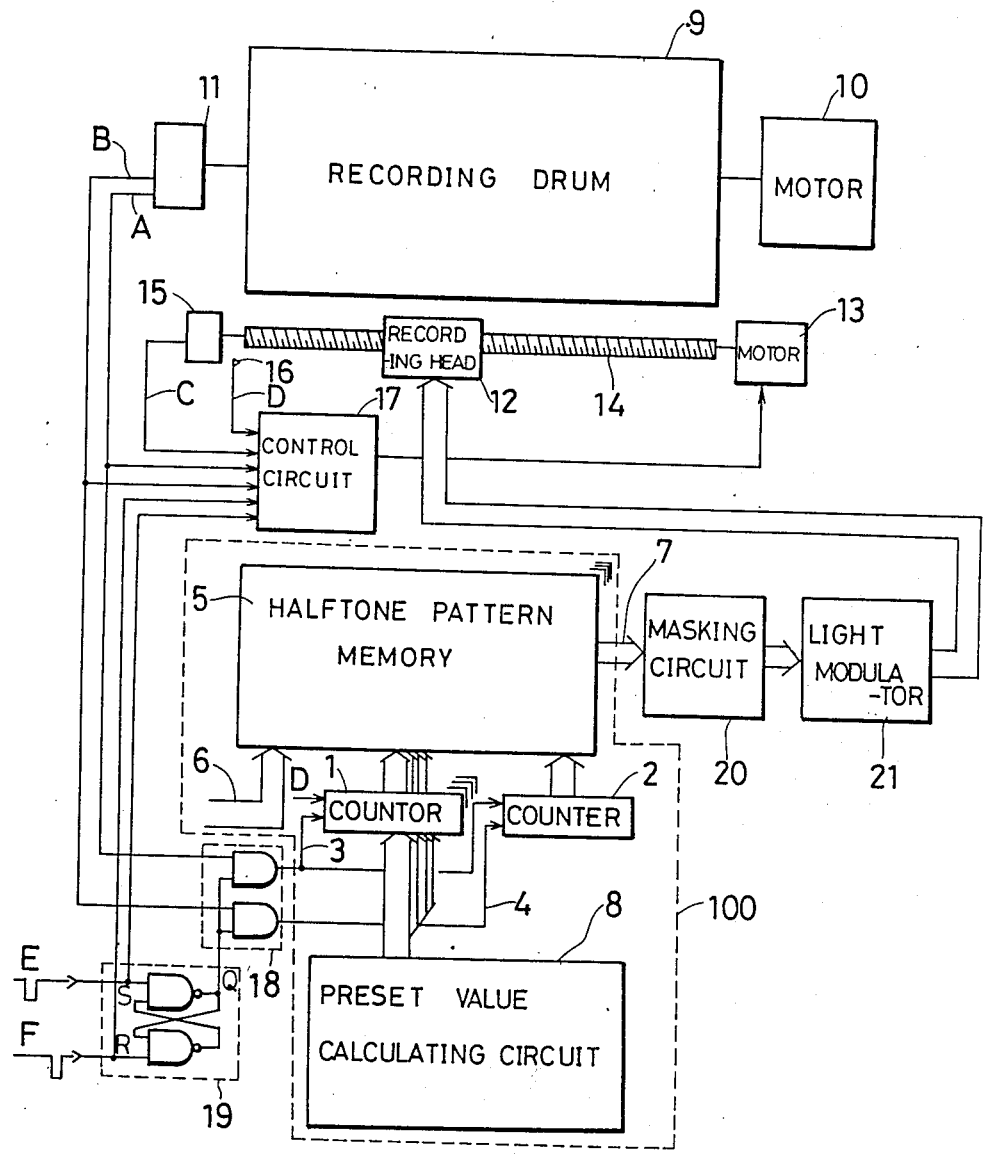
FIG. 3 is a block diagram showing an example of a drum-type scanner to which the present invention is applied.

FIG. 3 is a block diagram showing an example of structure of components only in a recording area, in case of applying the embodiment as shown in FIG. 2 to a drum-type scanner. Referring to FIG. 3, a block 100 in dotted lines denotes the above-described halftone dot generating device as shown in FIG. 2, and detailed description thereof is omitted.

A recording drum 9 is driven by a main scanning motor 10 to be rotated, which rotation is encoded by a rotary encoder 11 to be outputted as a main scanning origin pulse A and a prescribed number of count pulses B per rotation. A recording head 12 is moved in the sub scanning direction through a feed screw 14, the rotation of which is driven by a sub scanning motor 13, and the amounts of movement thereof are encoded by a sub scanning encoder 15 from the number of rotation and the screw pitches of the feed screw 14 to be outputted as count pulses C corresponding to the amounts of movement. A linear encoder may be employed as the sub scanning encoder 15 to derive signals directly corresponding to the positions of the recording head 12 in place of the said count pulses C. An origin position sensor 16 detects the movement of the recording head 12 to the sub scanning origin, to output sub scanning origin pulses D.

Through the aforementioned pulse signals A to D, a control circuit 17 controls the recording head 12 to continuously trace the same scanning locus in a plurality of times of scanning. Description is now briefly made on such a control method, which is disclosed in the aforementioned Japanese Patent Laying-Open Gazette No. 31359/1985. First, a theoretical sub scanning position $P_s$ is determined through the following expression:

$$P_s = K(L_n + \theta/\theta_m) + K_0 \quad \ldots (3)$$

where K represents a sub scanning feed pitch (=constant), $K_O$ represents distance (=constant) between the scanning start position in the sub scanning direction and the beginning end of the recording head 12 and $\theta_m$ represents the amount of entire main scanning position angle (constant value corresponding to 360°). Further, $L_n$ represents the number of scanning lines, which can be recognized by counting the main scanning origin pulse A per rotation and $\theta$ represents a main scanning position angle which can be recognized by counting the count pulses B. On the other hand, an actual sub scanning position $P_s'$ is obtained by counting the count pulses C from the sub scanning encoder 15. This count value is reset by the sub scanning origin pulses D. On the basis of $P_s$ and $P_s'$ thus obtained, the control circuit 17 controls the rotation of the sub scanning motor 13 to increase the feeding speed of the recording head 12 when $P_s > P_s'$ while reducing the said feeding speed when $P_s < P_s'$, thereby to achieve the aforementioned control. Such control is performed only in an interval from supply of a scanning start pulse E to supply of a scanning end pulse F, i.e., a scanning interval. The scanning start pulse E obtained by the expression (1) is different from that obtained by the expression (2).

On the other hand, the main scanning origin pulse A and the count pulses B from the rotary encoder 11 are supplied through a gate circuit 18 to the sub scanning line counter 1 and the main scanning position counter 2. The gate circuit 18 is controlled by Q outputs of a flip-flop circuit 19, which in turn is set by the scanning start pulses E to generate high-level Q outputs and reset by the scanning end pulses F to output low-level Q outputs. Therefore, the gate circuit 18 is opened only in the sub scanning intervals, and the main scanning origin pulse A and the count pulses B from the rotary encoder 11 pass through the gate circuit 18 only in the sub scanning intervals, to be supplied to the sub scanning line counter 1 and the main scanning position counter 2.

As hereinabove described, the vertical line counter 1 is in count width indentical to the pattern repeating cycle of the halftone dot pattern, and is reset by the sub scanning origin pulses D from the origin position sensor 16 to count the main scanning origin pulse A. The main scanning origin pulse A corresponds to the count signal 3 (that supplied every time the recording head 12 completes scanning for one scanning line) as hereinabove described with reference to FIG. 2.

Similarly to the sub scanning line counter 1, the main scanning position counter 2 is in the count width identical to the pattern repeating cylce, and reset by the main scanning origin pulse A per rotation of the recording drum 9, to count the count pulses B which are generated in an appropriate number during the rotation. The count pulses B correspond to the count signals 4 (those generated at appropriate intervals in response to the movement of the recording head 12 performing scanning on one scanning line) as hereinabove described with reference to FIG. 2.

When sub scanning is started from a position other than the sub scanning origin, the preset value calculating circuit 8 performs calculation of the expression (1) or (2) as hereinabove described, to preset the value as obtained in the sub scanning line counter 1. The preset value calculating circuit 8 may be formed by a microcomputer or in random logic.

On the basis of the count values of the sub scanning line counter 1 and the main scanning position counter 2 and the image input signals 6, the halftone pattern memory 5 supplies binary image output signals 7 as resulting halftone dots by the operation as hereinabove described with reference to FIG. 1. The halftone dots thus generated are continuous to those generated in advance thereto even if the scanning is started from the middle of the recording screen, as hereinabove described.

A masking circuit 20 performs masking operation to pass the image output signals 7 thus obtained for regions required in the main and sub scanning directions, i.e., to cut image signals unnecessary for recording. The image output signals 7 passed through the masking circuit 20 are converted into optical signals by a light modulator 21, to be outputted from the recording head 12. Thus, the halftone dots are recorded on photosensitive material (not shown) on the recording drum 9.

In general, four halftone pattern memories 5 and four sub scanning line counters 1 are prepared in correspondence to four color printing plates (yellow, magenta, cyan and black plates). As to the preset value calculating circuit 8, four such circuits may be prepared or one preset value calculating circuit may be adapted to calculate four preset values in advance to starting scanning. Although the halftone pattern has been described as formed by one optical beam, record-scanning operation can be performed by multi-beam in order to reduce the scanning time. In this case, contents of the halftone pattern memory 5 may be formed to be divided into halftone patterns for respective optical beams, which are required by respective ones of the multiple beams. With respect to this, refer to, e.g., Japanese Patent Laying-Open Gazette No. 80639/1983.

According to the present invention as hereinabove described, the halftone patterns are always univocally determined with respect to the absolute record-scanning positions, whereby continuous halftone dots can be obtained even if scanning is performed only in a necessary scanning region in the middle of the recordig screen to connect images by a plurality of times of scanning, and hence plain layout processing time can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating halftone dots along predetermined halftone patterns on the recording screen on the basis of input image signals for use in an image scanning/recording unit, said method comprising the steps of:
   previously relating scanning positions in recording with partial positions of halftone patterns;
   presetting, in case of generating halftone dots from the middle of the screen, a partial position of a halftone pattern corresponding to a scanning start position in the middle of the recording screen; and
   generating said halftone dots from said preset partial position in response to said relation.

2. A method of generating halftone dots in accordance with claim 1, wherein
   said relating includes relating of the absolute sub scanning position obtained by counting a main scanning position and the number of sub scanning lines by counters with halftone dot density in said halftone pattern partial positions.

3. A method of generating halftone dots in accordance with claim 2, wherein
   said halftone patterns are cyclic and said counters are provided for the pattern cycles.

4. A method of generating halftone dots in accordance with claim 1, wherein
   said presetting includes presetting of the remainder of $L_n/L_c$ assuming that $L_c$ represents the pattern repeating cycle line number in case of starting record-scanning from an $L_n$-th scanning line from the scanning origin.

5. A method of generating halftone dots in accordane with claim 1, wherein
   said presetting includes presetting of the remainder of $(L_n-L_r)/L_c$ assuming that $L_c$ represents the pattern repeating cycle line number and $L_r$ represents the number of lines required for the rise of a scanning mechanism in case of starting record-scanning from an $L_n$-th scanning line from the scanning origin.

6. An apparatus for generating halftone dots along predetermined halftone patterns on the recording screen on the basis of input image signals for use in an image scanning/recording unit, said apparatus comprising:
   counters for relating scanning positions in recording with partial positions of halftone patterns;
   preset means for presetting an arbitrary partial position of a halftone pattern in the middle of the recording screen in said counters; and
   halftone dot generating means for generating halftone dots in response to said counters from said preset partial position in case of generating halftone dots from the middle of the recording screen.

7. An apparatus for generating halftone dots in accordance with claim 6, wherein
   said halftone patterns are cyclic and said counters are provided for pattern repeating cycles.

8. An apparatus for generating halftone dots in accordance with claim 7, wherein
   said preset means includes means for presetting the remainder of $L_n/L_c$ assuming that $L_c$ represents the pattern repeating cycle line number in case of starting record-scanning from an $L_n$-th scanning line from the scanning origin.

9. An apparatus for generating halftone dots in accordance with claim 7, wherein
   said preset means includes means for presetting the remainder of $(L_n-L_r)/L_c$ assuming that $L_c$ represents the pattern repeating cycle line number and $L_r$ represets the number of lines required for the rise of a scanning mechanusm in case of starting record-scanning from an $L_n$-th scanning line from the scanning origin.

* * * * *